Feb. 20, 1923.

W. C. DWYER ET AL 1,446,115

CENTER CUTTING ATTACHMENT FOR DISK HARROWS

Filed June 29, 1921

Inventors:-
William C. Dwyer,
and Joseph I. Mitchell,
By W.P. Doolittle
Atty.

Patented Feb. 20, 1923.

1,446,115

UNITED STATES PATENT OFFICE.

WILLIAM C. DWYER AND JOSEPH I. MITCHELL, OF AUBURN, NEW YORK, ASSIGNORS TO INTERNATIONAL HARVESTER COMPANY, OF CHICAGO, ILLINOIS, A CORPORATION OF NEW JERSEY.

CENTER-CUTTING ATTACHMENT FOR DISK HARROWS.

Application filed June 29, 1921. Serial No. 481,255.

*To all whom it may concern:*

Be it known that we, WILLIAM C. DWYER and JOSEPH I. MITCHELL, citizens of the United States, and residents, respectively, of Auburn, in the county of Cayuga and State of New York, and of Auburn, in the county of Cayuga and State of New York, have invented certain new and useful Improvements in Center-Cutting Attachments for Disk Harrows, of which the following is a full, clear, and exact specification.

This invention contemplates certain improvements in attachments for disk harrows, and the object of the invention is to provide a simple and inexpensive attachment for cultivating or cutting out the ridge that is usually left between the two gangs of disks, and one which will be automatically moved to and from working position with the shifting of the gangs. This is accomplished by providing a structure including a guide rod formed with a downwardly and rearwardly inclined portion and connected to the longitudinally extending central frame members of the harrow, this rod serving as a guide or track on which a yoke-shaped bracket member, which has its arms connected to the inner ends of the gangs, rides in a fore and aft direction as the gangs are shifted. This bracket carries a tilling tool, such as a spring cultivator tooth, and by reason of the inclined track on which the bracket rides, this tool is raised and lowered as the gangs are shifted.

With this main object in view, the invention consists of the organization, details of construction, parts, or their equivalents, described in the following specification and more particularly defined in the claims.

Referring to the drawings—

Figure 1:
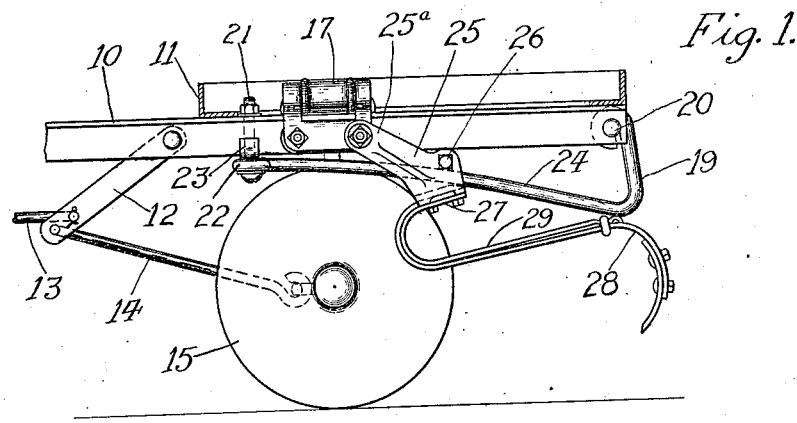
Fig. 1 is a central longitudinal section through a harrow, showing the center cutting attachment in raised position.

Our invention is illustrated in connection with a disk harrow comprising the central frame members 10, which in this case are a pair of angle bars on which the main harrow frame 11 is supported. A depending bar 12 is pivoted between the angle bars 10 and at its lower end the angling rod 13 leading to angling mechanism on the forward part of the angle bars (not shown) is connected, as well as a pair of connecting rods 14 leading to the inner end of each gang of the harrow. The disk gangs 15 with their frames 16 are pivoted on the harrow frame 11 in the usual manner and are swung to and from angled or working position by means of the angling mechanism operating through the links 13 and 14 above described. The gang frames 16 are preferably connected by means of the saddle member 17 which is provided with laterally extending lugs pivotally connected to the gang frames at 18, and this saddle member is supported on rollers for movement in a fore and aft direction on the angle members 10. The parts so far described are those of a known type of harrow construction and are not part of our present invention, except as they act in combination therewith.

Figure 3:
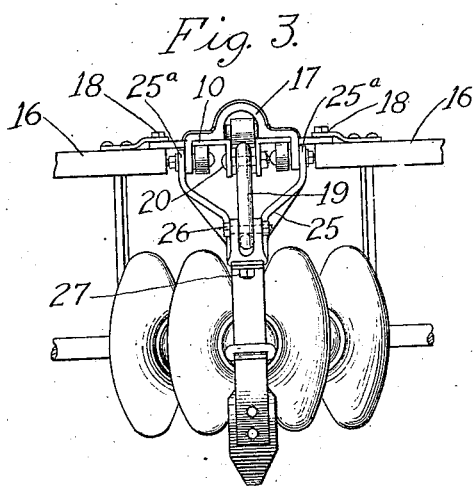
Fig. 3 is a sectional rear elevation showing the center cutter in lowered position.

The structure comprising our invention includes a guiding element represented in this case by the rod 19 which has its rear end upwardly bent and secured at 20 between the angle members of the central draft frame of the harrow and its forward end secured beneath the angle members by a vertical bolt 21 passing through an eye 22 on the end of the rod which rests against a clip 23, bridging the space between the angle members 10. When in position this rod presents a downwardly and rearwardly inclined portion 24 which serves as a track or guide for a tool carrying bracket which, in this instance, is shown in the form of a yoke-shaped casting 25 which has upwardly extending arms terminating in parallel ends 25ª which are pivotally connected to the inner ends of the gang frames, the connection in this instance being through the medium of the saddle member 17, as best seen in Fig. 3. This yoke member is provided with a transverse bearing element such as the bolt 26, positioned to engage and travel on the upper side of the guide rod 19 which is embraced between the sides of the lower end of the yoke and the bottom of which engages the under side of the rod when the parts are in working position. To the under side of the bracket 25 there is secured, as at 27, a soil tilling tool which in this case is represented as a spring cultivator tooth 28, which is preferably reinforced at the heel by an auxiliary spring 29 of the same configuration as the tooth, but terminating short of its end and secured thereto by a clip 30.

Figure 2:
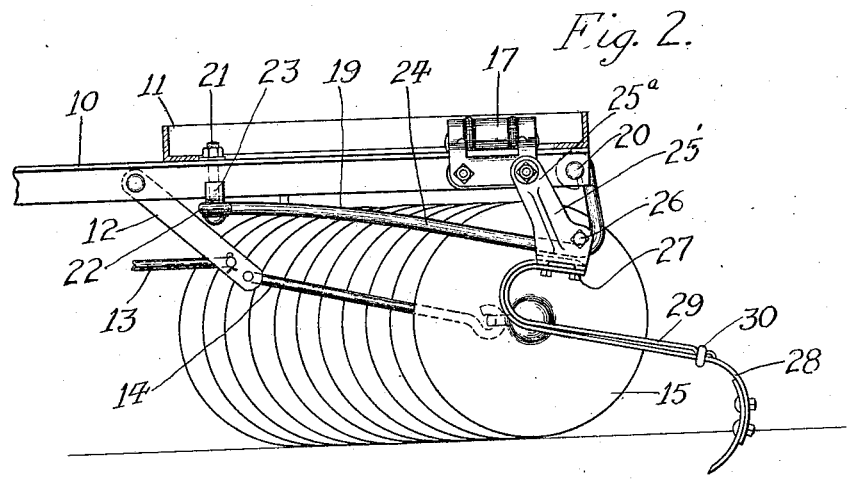
Fig. 2 is a similar view showing the harrow in angled position and the center cutter lowered.

With the parts constructed and arranged as above described, it will be understood that as the gangs are swung from the non-working position shown in Fig. 1, to the angle or working position, shown in Fig. 2, and vice versa, the bracket member 25 will move back and forth on the inclined portion 24 of rod 19 as the gangs are shifted and due to the shape of this rod the bracket will be moved in a vertical plane causing the tillage tool attached thereto to be raised and lowered from and to working position as the gangs are shifted, thus providing a simple and inexpensive construction and one which is positive in its operation.

While the above disclosure exemplifies one form which our invention may take, it will be understood that variations therefrom are contemplated within the scope of the following claims.

We claim as our invention:

1. The combination with a disk harrow comprising central frame members, a pair of pivoted disk gangs, means for shifting the gangs, and a saddle member connecting the inner ends of the gangs and movable on the frame members, of a pendent yoke-shaped bracket having its arms pivoted on the saddle member, a rearwardly and downwardly extending guide member secured to the frame members and extending between the arms of said bracket, an element on the bracket engaging said guide, and a soil tilling tool secured to said bracket.

2. The combination with a disk harrow comprising central frame members, a pair of pivoted disk gangs, means for shifting the gangs, and a saddle member connecting the inner ends of the gangs and movable on the frame members, of a pendent yoke-shaped bracket having its arms pivoted on the saddle member, a soil tilling tool secured to said bracket and means on the frame and cooperating with said bracket for swinging it up and down on its pivot when the gangs are shifted from and to working position.

3. The combination with a disk harrow comprising central frame members, a pair of pivoted disk gangs, means for shifting the gangs, and a saddle member connecting the inner ends of the gangs and movable on the frame members, of a bracket connected to the saddle member and movable in a vertical plane, a soil tilling tool secured to said bracket, and means on the frame and cooperating with said bracket for moving it up and down when the gangs are shifted from and to working position.

4. The combination with a disk harrow comprising a frame, a pair of pivoted disk gangs and means for shifting the gangs, of a rearwardly and downwardly extending guide member secured to the frame, a bracket connected to the inner ends of the gangs and having a part engaged with said guide and movable in a fore and aft direction thereon as the gangs are shifted, and a soil tilling tool secured to said bracket.

5. The combination with a disk harrow comprising a frame, a pair of pivoted disk gangs, and means for shifting the gangs, of a soil tilling tool carried by the inner ends of the gangs, and means for raising and lowering said tool as the gangs are shifted from and to working position.

6. A center cutting attachment for disk harrows comprising an inclined guide member adapted to be connected to a harrow frame, a bracket mounted for travel on said guide and having arms adapted to be connected with the inner ends of the harrow gangs, and a soil tilling tool secured to the bracket.

7. A center cutting attachment for disk harrows comprising a guide rod formed with an inclined portion and with its ends adapted to be secured to a harrow frame, a yoke-shaped bracket enclosing the rod and mounted to travel on the inclined portion thereof and having its arms formed for connection with the inner ends of the harrow gangs, and a soil tilling tool secured to the bracket.

In testimony whereof we affix our signatures.

WILLIAM C. DWYER.
JOSEPH I. MITCHELL.